(12) United States Patent
Hegarty

(10) Patent No.: US 6,173,936 B1
(45) Date of Patent: *Jan. 16, 2001

(54) ADHERABLE SUPPORT BODY ENGAGEABLE UNIVERSALLY POSITIONABLE DOCUMENT HOLDER

(76) Inventor: David Hegarty, 36 Wyatt Rd., Garden City, NY (US) 11530

( * ) Notice: Under 35 U.S.C. 154(b), the term of this patent shall be extended for 0 days.

This patent is subject to a terminal disclaimer.

(21) Appl. No.: 09/217,664

(22) Filed: Dec. 21, 1998

Related U.S. Application Data

(63) Continuation of application No. 08/838,455, filed on Apr. 7, 1997, now Pat. No. 5,881,986.

(51) Int. Cl.⁷ .................................................. B41J 11/02

(52) U.S. Cl. .......................................... 248/442.2; 248/918

(58) Field of Search ........................... 248/442.2, 447.1, 248/483, 918, 447.2

(56) References Cited

U.S. PATENT DOCUMENTS

| 5,082,235 | * | 1/1992 | Crowther et al. | 248/442.2 X |
| 5,549,268 | * | 8/1996 | Hopwood | 248/442.2 |
| 5,881,986 | * | 3/1999 | Hegarty | 248/442.2 |
| 5,975,478 | * | 11/1999 | Marino | 248/442.2 |

* cited by examiner

Primary Examiner—Ramon O. Ramirez

(57) ABSTRACT

An adherable document support stand for removably mounting a document holder includes a support body fitted with a through receiving mortise. The support body is adherable at either side of a video display monitor and positions the through mortise in a forward facing direction. A document holder includes a copyholder, a dual ball and socket assembly, and an engageable support arm for mounting and securing the document holder on the support body. The support arm includes a frictionally engageable portion which is slidably received by an entry opening of the receiving mortise so that the document holder may be secured to the support body. The stand allows the copyholder to be slidably mounted or removed and, once mounted, to be extended or retracted by its user and to be adjusted laterally, vertically and universally with respect to its rotational position.

11 Claims, 9 Drawing Sheets

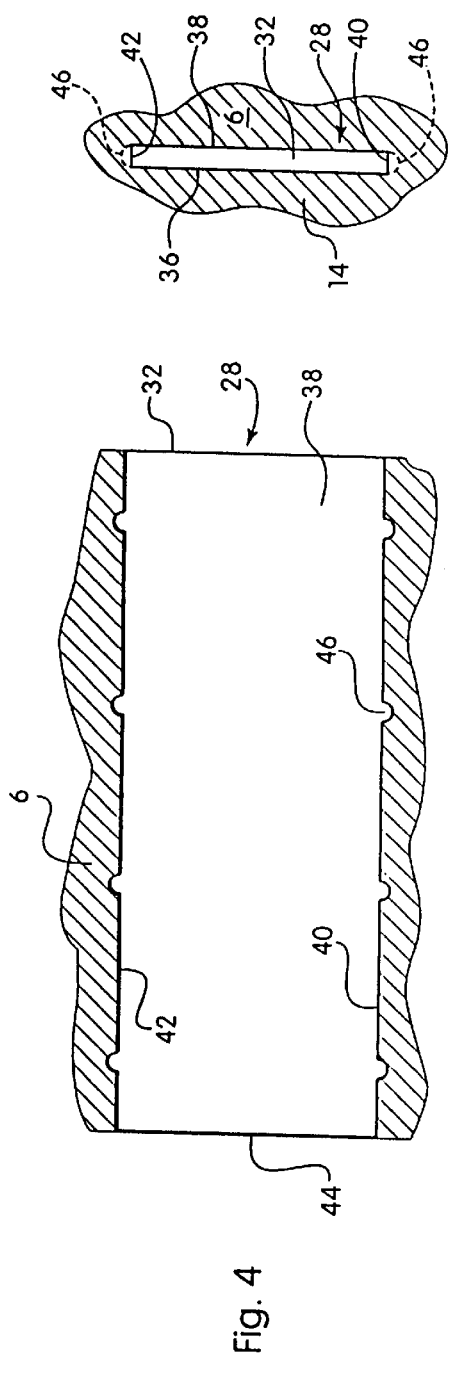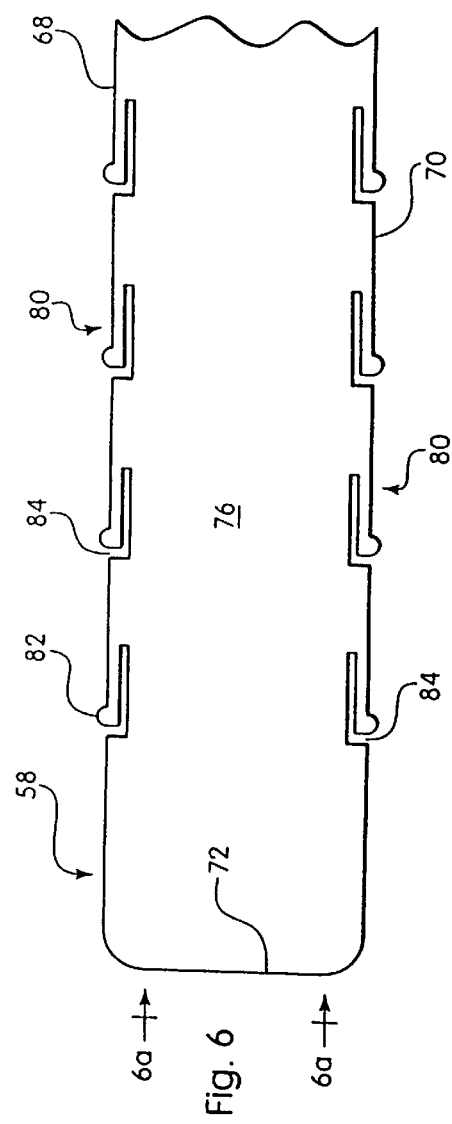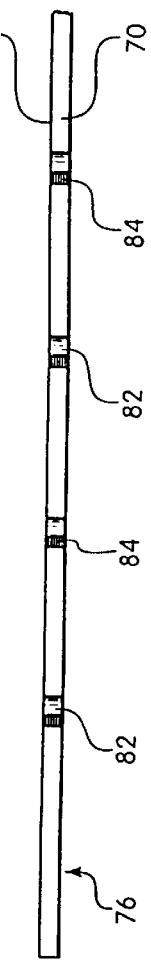

ADHERABLE SUPPORT BODY ENGAGEABLE UNIVERSALLY POSITIONABLE DOCUMENT HOLDER

CROSS-REFERENCE TO RELATED APPLICATION

This application is a continuation of Ser. No. 08/838,455, filed Apr. 7, 1997, now U.S. Pat. No. 5,881,986, which issued on Mar. 16, 1999.

STATEMENT REGARDING FEDERALLY SPONSORED RESEARCH OR DEVELOPMENT

Not Applicable.

REFERENCE TO A "MICROFICHE APPENDIX"

Not Applicable.

BACKGROUND OF THE INVENTION

1. Field of the Invention

This invention relates to document support devices and more particularly to a video display monitor which engages a removably mountable and universally positionable document holder.

2. Description of the Prior Art

The term "casing" herinafter refers to members which make up the outer cover, or housing, of a video display monitor.

The term "document" hereinafter refers to a single page or a multiple number of pages.

The term "document support monitor" hereinafter refers to a video display monitor which is fitted with specific means for removably mounting an engageable document holder.

The term "document holder" hereinafter refers to a copyholder which includes means for mounting a document and which further includes means for engaging the mounting means of a specifically fitted support body.

The term "document support monitor stand" hereinafter refers to a document support monitor and its engageable document holder.

Despite the fact that computers are now worldwide and used my millions of individuals the video display monitor art is quite limited in providing specific means for engaging a document holder. The need for such an ability is quite apparent when one observes how often a computer operator finds it necessary to refer to the hardcopy of a document when sitting in front of the computer screen.

The prior art discloses three references (two of which include the same disclosure) which relate to a video display monitor which is fitted with specific means for removably mounting an engageable document holder (document support monitor stand).

U.S. Pat. No. 4,475,705 (Henneberg et al.) discloses a document support monitor stand which has an annular groove formed in four of its sides (excluding its front and rear sides) for engaging the tubular bracket of its document holder. The document holder includes a bracket and a copyholder. The copyholder can be mounted on the left or right side of the monitor casing by changing the position of the mounted bracket. The copyholder can be slid and/or turned on the bracket (by loosening a thumbscrew) allowing for its adjustment both vertically and sideways. There is no provision for extending or retracting the location of the copyholder.

Two additional references which disclose the same document support monitor stands are U.S. Pat. No. 5,385,327 (Hegarty et al.) and U.S. Pat. No. 5,618,020 (Hegarty et al.). These patents disclose a document support monitor stand which has specific means residing on either of the outward facing left and right sides of the monitor for mounting an engageable document holder. The mounting and engaging means require the cooperation of either one or two protruding rails and a slotted member. The document holder includes a support arm, a positioning device, and a copyholder. The document holder is mounted by initially approaching the desired side from a direction which is normal to the side, alternatively, in a second form of the invention, access to the left or right side is provided from the top side of the monitor. The vertical height of the copyholder is changed by moving the location of the document holder's support arm on the mounting side of the monitor. Additionally, the document holder includes a multi-positional device for changing the position of the copyholder's viewing side. The multi-positional device positions the viewing side about three separate, distinct, axes of rotation. The document holder's support arm contains telescoping means for extending and retracting the location of the copyholder.

One of the primary disadvantages of the document support monitor stands disclosed in the prior art is that they require a modification in the exterior design of the left and right sides of the monitor casing. Such a modification is a hindrance when one considers that the modern day video display monitor is frequently equipped with controls and/or mounted speakers at its sides.

Another significant disadvantage of the document support stands disclosed in the prior art is that they do not allow for engagement of its members at the front, forward facing side of the monitor, the side which is most easily accessible by its user.

A yet further disadvantage of the document support monitor stands disclosed in the prior art is that the monitors means for mounting a document holder are frequently not appropriate for monitors having different shapes from those disclosed in the cited references. Consequently, the cited document holders can not be all-inclusive in their ability to engage the document holder mounting means of differently shaped monitors.

An even yet further disadvantage of the document support monitor stands disclosed in the prior art is that their engaged document holders are limited in their ability to change the spatial (vertical/horizontal) location and viewing (tilt) position of their supported copyholders.

BRIEF SUMMARY OF THE INVENTION

It is an object of the present invention to provide for a document support monitor which has at least one forwardly disposed receiving mortise formed within its casing for receiving an engageable portion of a mountable document holder.

It is another object of the present invention to provide for a document support monitor which can slidably receive a document holder without encumbering the left and right outward facing sides of the monitor casing.

It is yet another object of the present invention to provide for an economical and esthetically pleasing document support monitor casing which is capable of engaging a document holder.

It is a further object of the present invention to provide for a document support monitor which is capable of engaging a document holder in the absence of slotted patterns or protruding rails formed in, or on, the outward facing sides of the monitor.

It is a still further object of the present invention to provide for a document support monitor with an all-inclusive means for mounting a document holder.

It is yet a further object of the present invention to provide a document support monitor stand which engages a document holder having a tensional and universally positionable ball and socket assembly.

It is still object of the present invention to provide for a document support stand which includes means for extending and retracting the location of the stand's copyholder through the slidable cooperation of the monitor's mounting means and the engageable support arm of the document holder.

In accordance with one aspect of the present invention a document support monitor includes a video display monitor which has been modified to include, within its casing, at least one mounting device for removably mounting a document holder on the monitor. The mounting devise is housed in the interior of the casing.

In a preferred form of the present invention the monitor is fitted with a pair of hollowed out, receiving through mortises which are formed in the shape of a narrow, rectangular right prism. The mortises are located at the front side of the monitor, vertically aligned, with each standing on its narrow wall, at opposite sides of the display screen with each having its entry opening disposed in a forward facing direction.

According to the present invention a document holder, such as a copyholder, includes a document mounting device (for example, the mounting clip), a positioning device for changing both the location in space, and the viewing position of the copyholder (for example, the tensional, and universally positional, dual ball and socket assembly, to which the copyholder is attached), and an engageable support member (to which the ball and socket assembly is also attached) for mounting the document holder on the document support monitor.

The engageable support member in its preferred form includes a tenon-like, insertable, engagement portion which is formed in the shape of a solid rectangular right prism which is slightly smaller in size than the rectangularly shaped receiving mortise opening. The engagement portion of the holder is slidably received by either one of the receiving through mortises by means of the mortise's entry opening so that the document holder may be frictionally secured to the document support monitor.

The present form of the invention may also include means for fixating the insertable, engagement portion of the support arm at a plurality of different locations within each mortise. The fixating means includes: a series of concave, niche, stop locations formed in the upper and lower walls of each mortise; and mutually engageable resiliently biased springboards, having dome-like protrusions, formed transversely along the longitudinal edges of the insertable, engagement portion of the support arm.

Once the document holder is engaged with the document support monitor the copyholder and its documents may be disposed both in a multiplicity of different locations in space and in a multiplicity of different viewing positions through the slidable movement of the engagement portion of the support arm within the receiving mortise and also through the assistance of the tensional, and universally positionable, dual ball and socket assembly.

These and other objects, features and advantages of this invention will be apparent from the following detailed description of illustrative embodiments thereof, which is to be read in connection with the accompanying drawings.

BRIEF DESCRIPTION OF THE SEVERAL VIEWS OF THE DRAWINGS

FIG. 4 is a plan view of the left receiving mortise shown in FIG. 2.

FIG. 4A is a fragmentary, front view of the left receiving mortise shown in FIG. 2, taken along line 4a—4a of FIG. 2.

FIG. 6 is a fragmentary, side elevational view of the support arm shown in FIG. 5, showing the engagement portion of the support arm and its resilient springboards.

FIG. 6a is a side elevational view of the support arm shown in FIG. 6, taken on line 6a—6a of FIG. 6.

FIG. 7 is a top plan view of the engagement portion shown in FIG. 6.

DETAILED DESCRIPTION OF THE INVENTION

Figure 1:
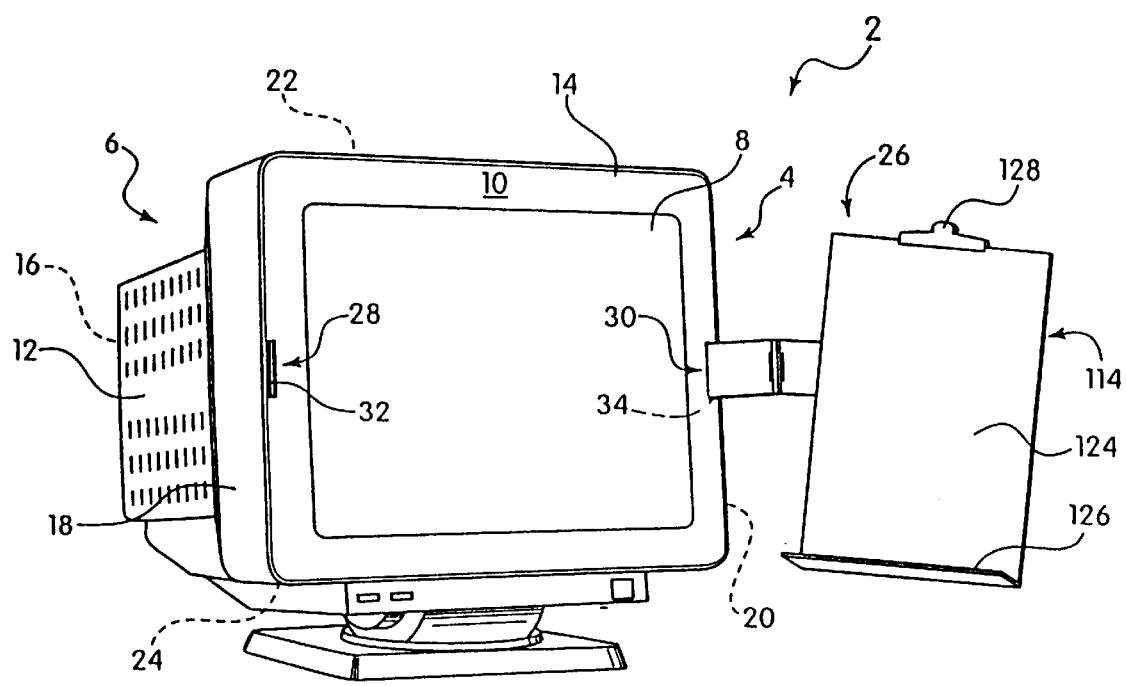
FIG. 1 is a perspective view of the document support stand, constructed in accordance with one form of the present invention.
Figure 2:
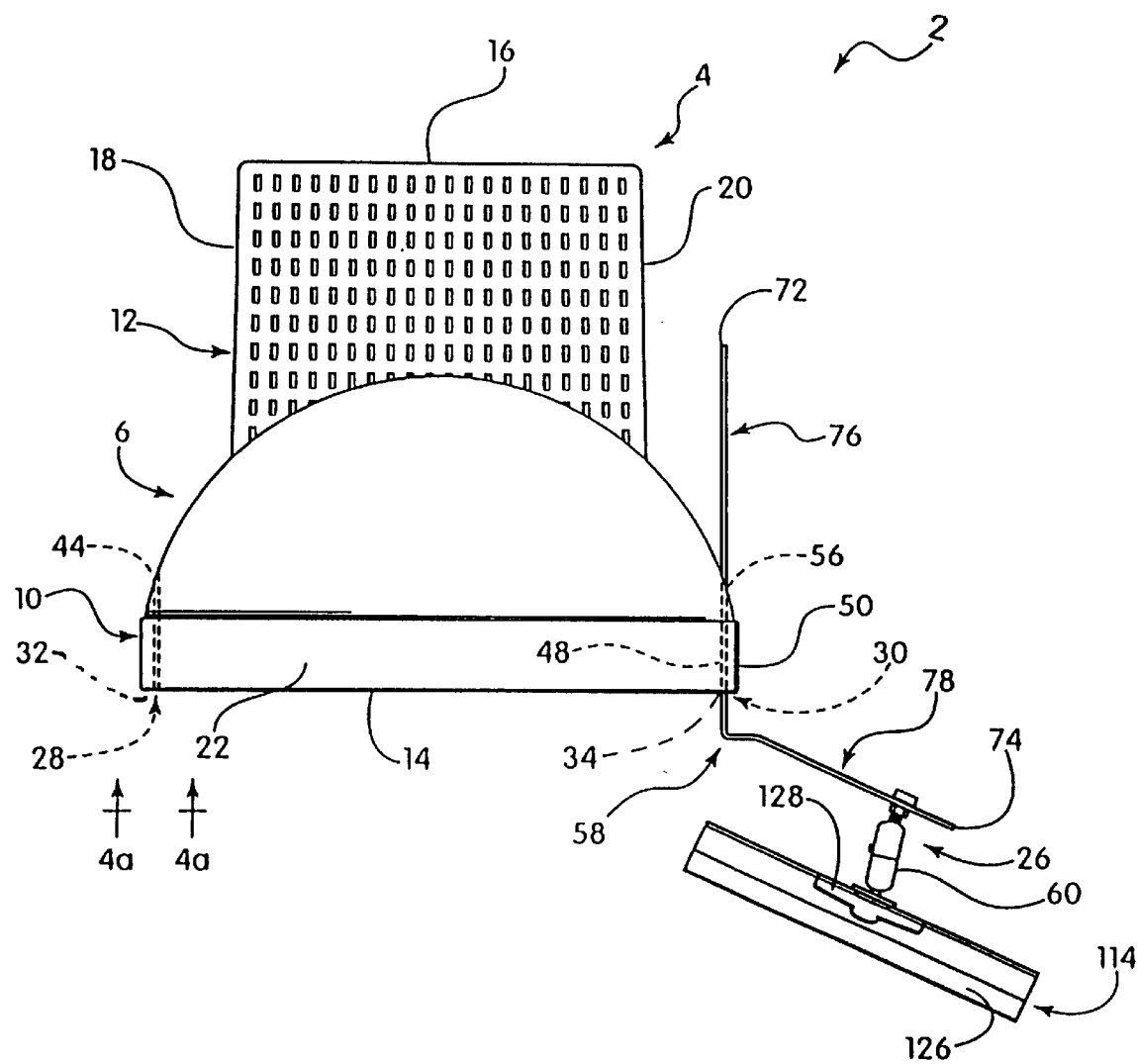
FIG. 2 is a top plan view of the document support stand shown in FIG. 1.

Initially referring to FIGS. 1 and 2, it will be seen that a document support monitor stand 2, constructed in accordance with one form of the present invention, includes document support monitor 4 (a modified video display monitor) has a casing 6 which provides the outer cover, or housing, for the monitor.

In this form of the invention, the casing may be of a common type having an irregular, stepped down shape and may be considered to consist of two sections, a front, widened section 10, and a rear, narrowed section 12. The casing 6 includes a front, forward tacking entry side 14 having screen 8, a rear, backward facing side 16, a left, outward facing side 18, a right, outward facing side 20, a top, upward facing side 22 and a bottom, downward facing side 24.

Figure 5:
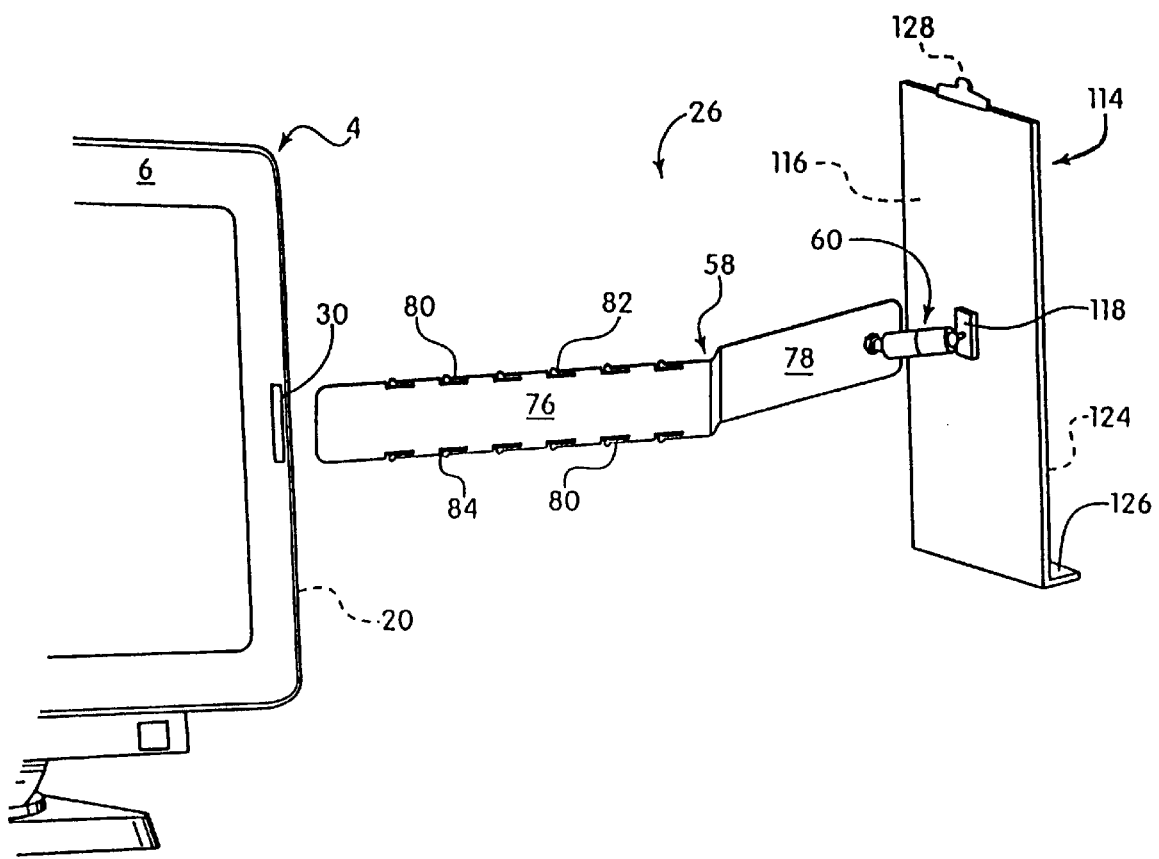
FIG. 5 is a partial, perspective view of the document support monitor stand shown in FIG. 1, with its document holder disengaged from the receiving mortise, showing its support arm, dual ball and socket assembly, and copyholder.

Front widened section 10 of casing 6 includes a provision for mounting a document holder 26 on the monitor. As illustrated in FIGS. 1 and 5, in association with FIG. 2, front entry side 14, of front widened section 10, includes a pair of similarly formed and sized receiving through mortises, namely, left receiving mortise 28 and right receiving mortise 30, housed within the casing 6. Each mortise 28 and 30, has a vertically aligned, rectangularly shaped entry opening 32 and 34, respectively, for providing entry into the mortise. The entry openings are located to each vertical side of the display screen 8 at a height which is at the approximate center of the screen.

Figure 3:
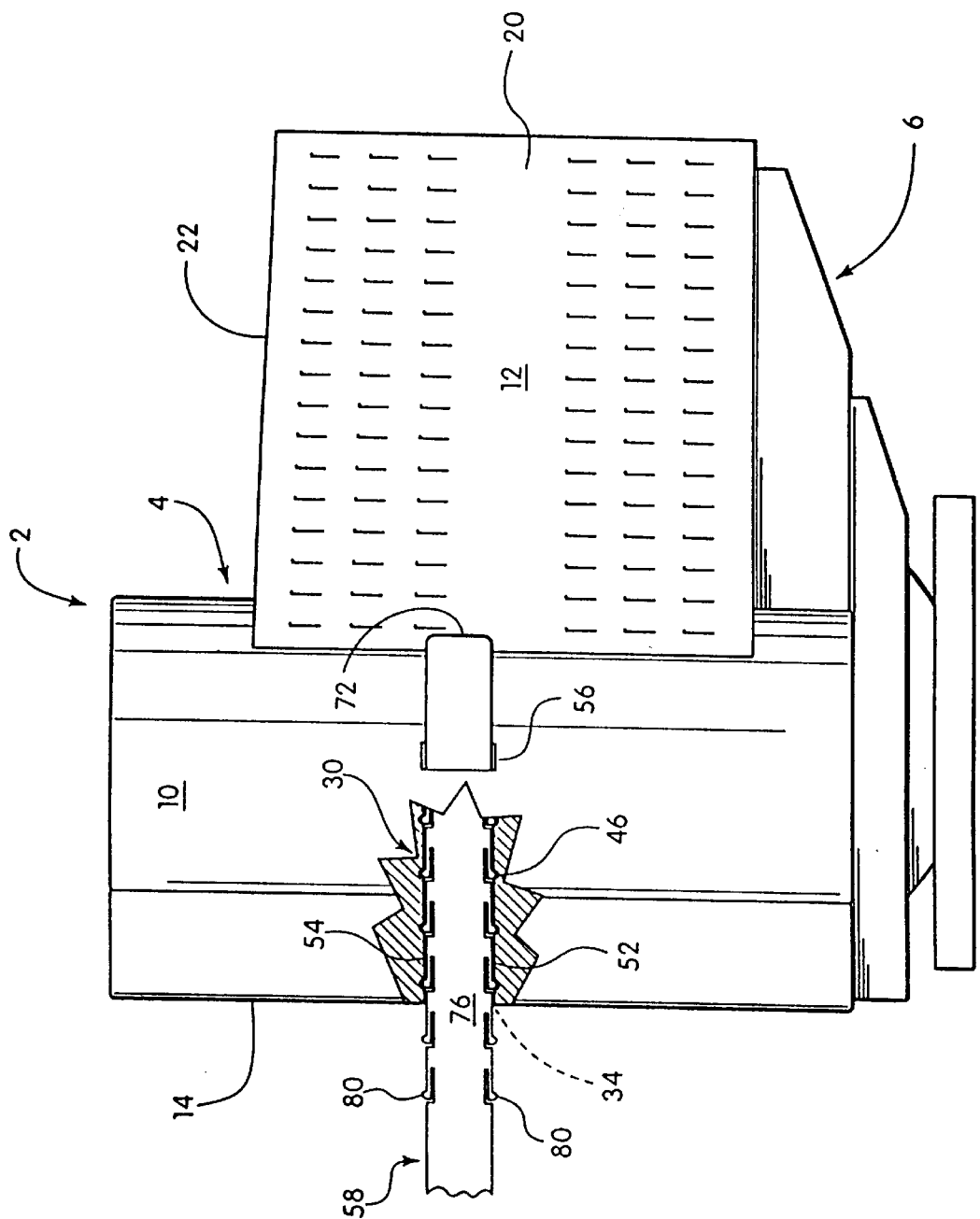
FIG. 3 is a fragmentary side view, partially broken away, of the document support stand shown in FIG. 1, showing the engagement of the document holder in the right receiving mortise.

As illustrated in FIGS. 4 and 4a, in association with FIG. 2, left receiving mortise 28 is formed in the shape of a rectangular right prism having left, wide, vertical planar wall 36, right, wide, vertical planar wall 38, lower, narrow, horizontal wall 40, and upper, narrow, horizontal wall 42. Mortise 28 also includes through opening 44 which is oppositely disposed to entry opening 32. Mortise 28 may further include a plurality of spaced apart concave detents or niches 46 formed in each of its horizontal walls 40 and 42. The niches 46 extend transversely to the longitudinal direction of the mortise. Niches 46 are provided to cooperate in the engagement of document holder 26 on the monitor. FIGS. 2 and 3 show that right receiving mortise 30 is formed similarly to left receiving mortise 28, having left vertical planar wall 46, right vertical planar wall 50, lower horizontal wall 52, and upper horizontal wall 54. As shown in FIG. 2, mortise 30 includes through opening 56 which is oppositely disposed to entry opening 34 mentioned previously. Like mortise 28, mortise 30 also further includes a plurality of spaced apart concave niches 46 along each of its horizontal walls 52 and 54. In describing the general location of receiving mortises 28 and 30 each mortise may be described as being bounded by left, right, top and bottom sides, 18, 20, 22 and 24, respectively. A video display monitor which is modified in the manner just described is capable of providing for the mounting and firm engagement of document holder 26 to be described next.

Figure 10:
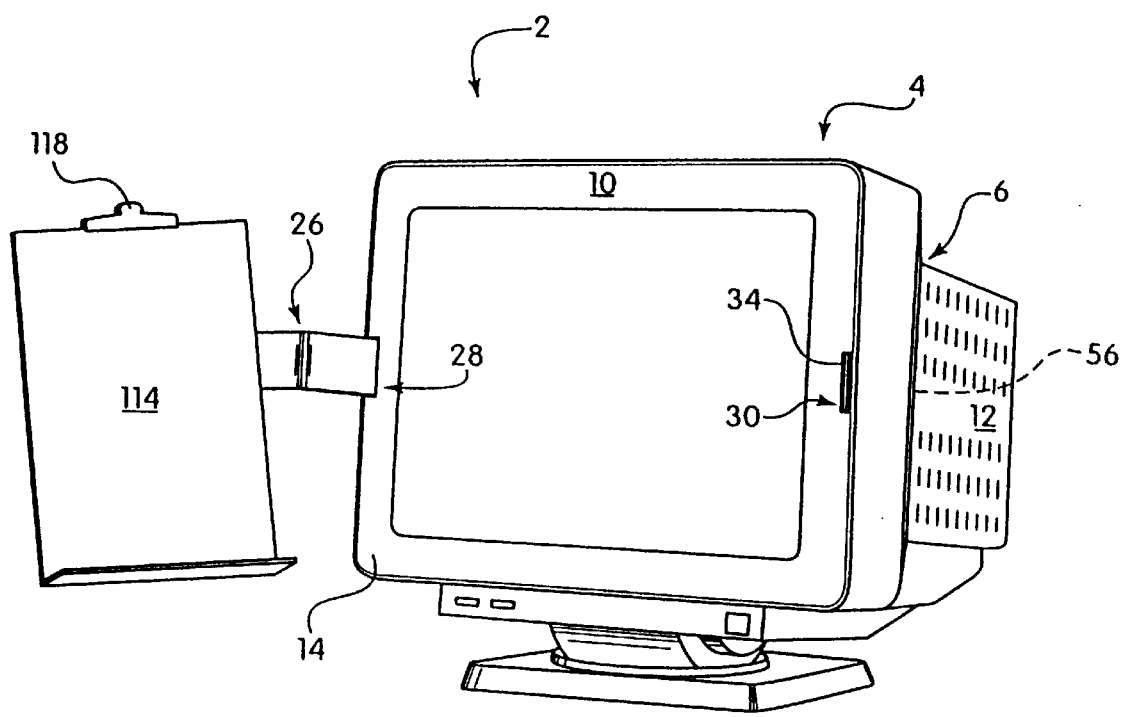
FIG. 10 is a view, like that of FIG. 1, showing the document holder engaged in the left receiving mortise of the document support monitor.

FIG. 5, in association with FIG. 2, illustrates one form of a document holder 26 constructed in accordance with the present invention. FIGS. 1 and 10 show document holder 26 mounted on the document support monitor stand 2 by means of receiving mortise 28 and 30, respectively. As shown in FIG. 5, document holder 26 may consist of a semi-rigid support arm 58, a tensional, and universally positional, dual ball and socket assembly 60, and a copyholder 114. As shown in FIGS. 6, 6a, and 7, the semi-rigid support arm 58 may be initially formed from a rectangular right prism. Consequently, the support arm 58 includes first longitudinal planar wall surface 64, oppositely parallel, second longitudinal planar wall surface 66, first longitudinal edge 68, oppositely parallel, second longitudinal edge 70, and proximate insertable end 72. The support arm is considered to include a straight, tenon-like, insertable engagement portion 76 and an attachment portion 78, having distal end 74, as best shown in FIG. 2, bent at an oblique angle to the engagement portion. Since each equally sized receiving mortise 28 and 30 is also formed in the shape of a hollowed out, rectangular right prism the rectangularly shaped, tenon-like, insertable engagement portion 76 of the support arm 58 may be easily secured in the casing simply through a frictional fitting of the members.

As illustrated in FIGS. 5, 6, 6a, and 7, however, the engagement portion 76 of semi-rigid support arm 58 may have a plurality of flexible springboards 80 formed along each one of its longitudinal edges 68 and 70. Each flexible springboard 80 is created by forming a reclining L-shaped relief slot 84, as shown in FIG. 6, just below the surface of longitudinal edge 68 or 70. Additionally, each springboard 80 is fitted with a convex protrusion 82 at its flexible distal end. Each convex protrusion 82, being transversely disposed along longitudinal edge 68 or 70, is capable of cooperating with concave niches 46 formed in each one of the horizontal walls 40, 42 and 52, 54 of receiving mortises 28 and 30, respectively. Relief slot 84 allows the distal end of each springboard 80 to flex, thereby temporarily displacing protrusion 82 when support arm 58 is inserted in either receiving mortise. The cooperation of protrusions 82 and niches 46 provide support arm 58 with a plurality of positive engagement/stop positions when inserted, via its proximate insertable end 72, in either one of the receiving mortises 28 or 30.

Figure 8:
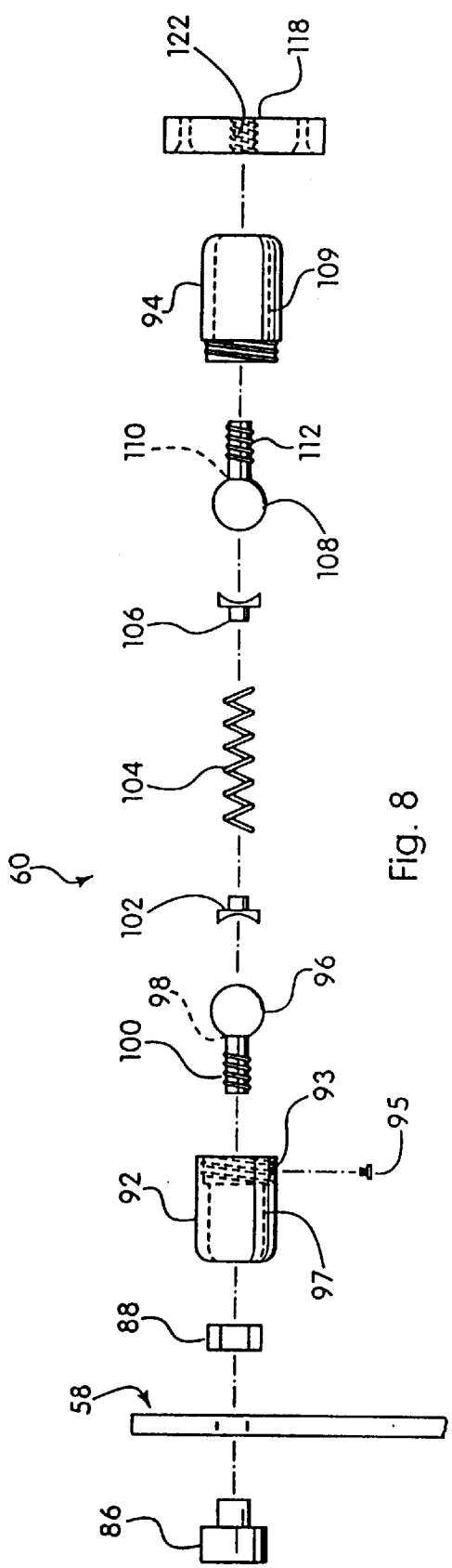
FIG. 8 is an exploded, side elevational view, partially broken away, of the dual ball and socket assembly shown in FIG. 5, and illustrating its method of attachment to the other components of the document holder.
Figure 9:
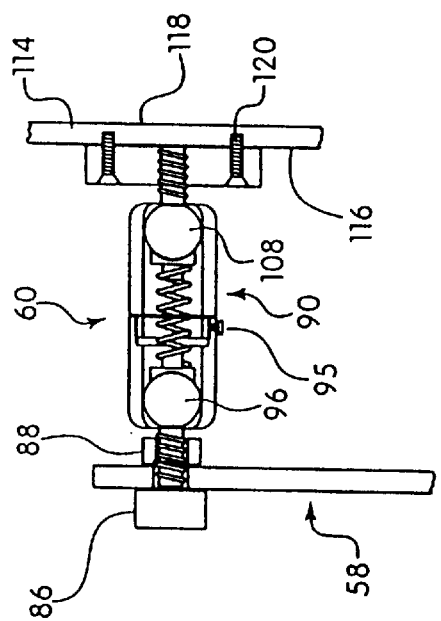
FIG. 9 is an assembled view of the components shown in FIG. 8.

As mentioned above, support arm 58 further includes an attachment portion 78. Attachment portion 58 is provided for the attachment of a copyholder. In the instant invention, as shown in FIG. 5, copyholder 114 is attached to support arm 58 by means of a tensional, and universally positional, dual ball and socket assembly 60. Dual ball and socket assembly 60 is a new adaptation and modification of a ball and socket assembly known in the art for mounting rear view mirrors in automobiles and disclosed in U.S. Pat. No. 3,635,435, the disclosure of which is herein incorporated by reference. Ball and socket assembly 60 allows copyholder 114 to be positional about two separate universal joints. The relationship between support arm 58, assembly 60 and copyholder may be best appreciated upon referring to FIGS. 8 and 9, in association with FIG. 2. FIGS. 8 and 9 demonstrate the attachment of ball and socket assembly 60 to support arm 58 and to copyholder 114.

Ball and socket assembly 60 is created by initially providing threaded dual ball and socket housing 90. Housing 90 consists of two major parts: proximate female socket threaded subhousing 92 and distal male threaded socket subhousing 94. In considering assembly 60, as best shown in FIG. 8, first, proximate ball 96 (having threaded bore 98 for receiving threaded nipple 100) is provided to be housed in proximate concave socket 97 of subhousing 92, while oppositely disposed second, distal ball 108 (having threaded bore 110 for receiving threaded nipple 112) is to be housed in distal concave socket 109 of subhousing 94. Each of the subhousings 92, 94 are provided with an enlarged hole at their interior concave end to allow for the projection of nipples 100, 112, respectively, and also to permit the movement of members. Assembly 60 further includes compression spring 104 in the middle of the assembly, disposed between balls 100 and 108, for applying a constant opposing pressure on each ball 100, 108 through the agency of concave pressure pads 102 and 106, respectively. As illustrated in FIG. 9, the members of assembly 60 are fitted together by the threadable engagement of subhousing 92 with subhousing 94. The threadable engagement of the members provides for the compression of spring 104 with a resultant constant tension, or force, at each end of the spring being applied to proximate ball and socket 96, 92 and distal ball and socket 108, 109, respectively. An added feature of the present invention provides for adjusting the amount of constant tension that bears on the members being maintained within housing 90. As illustrated in FIGS. 8 and 9, housing 90 is provided with a tension setting screw 95 which is threaded in hole 93. As can be appreciated by the illustrations, the compression of spring 104 may be changed simply by the amount of threadable engagement of subhousings 92 and 94. The point of threadable engagement is secured by screw 95 thereby maintaining the degree of firmness desired for a particular support purpose, for example, when copyholder 114 is supporting a heavy document.

Having described the structure of tensional, and universally positional, dual ball and socket assembly 60, its attachment to support arm 58 is accomplished simply by inserting nipple 100 of proximate ball 96 through a hole in attachment portion 78. The assembly is secured to the arm through the trapping cooperation of locknut 88 and female finger nut 86 on nipple 100, as illustrated in FIG. 9. The fabrication of document holder 26 is completed by the fitting of copyholder 114 to the distal end of assembly 60.

Upon referring to FIG. 5, in association with FIGS. 8 and 9, it is observed that copyholder 114 is a planar member having a front, viewing side 124 and a rear, oppositely disposed, rear side 116. The front viewing side 124 is provided with a support ledge 126 and a mounting clip 128 for mounting a document. The rear side 116 of copyholder 114 has mounting plate 118 attached by means of screws 120. Mounting plate 118 has threaded bore 122 which is provided to allow for its threadable engagement with distal threaded nipple 112 of assembly 60. The Just mentioned completes the description and assembly of the members which makeup document holder 26.

From the aforementioned, and upon referring to FIGS. 1 and 10, it can be appreciated that a distinctive feature of the present invention allows for the ease of mounting a document holder to either side of a video display screen simply by the slidable insertion of a portion of the document holder into a mortise, or cavity, formed in the casing. The insertion of engagement portion 76 of support arm 58 in either receiving mortise 28 or 30 may be described as including means for preventing sideways movement of the support arm to the left or right (64 and 66 being trapped by 36 and 38, or by 48 and 50,); and means for preventing vertical movement of the support arm up or down (68 and 70 being trapped by 40 and 42, or by 52 and 54). To assist the reader the just mentioned first cited reference numerals, which have also been described previously are: first vertical planar wall surface 64 of support arm 58, second vertical planar wall surface 66 of support arm 58, left vertical planar wall 36 of mortise 28, right vertical planar wall 38 of mortise 28; first longitudinal edge 68 of support arm 58, second longitudinal edge 70 of support arm 58, lower horizontal wall 40 of mortise 28, and upper horizontal wall 42 of mortise 28.

In describing another distinctive feature of the present invention, the display screen of the monitor may be defined to reside in an x-y coordinate plane and having a z-axis projecting normally from the x-y coordinate plane. Consequently, the semi-rigid support 58 arm may be defined as being extendable and retractable along a fixed line which is parallel to the projecting z-axis.

Additionally, a further distinctive feature of the instant invention is that the tensional, universally positional dual ball and socket assembly 60 provides a first, proximate universal joint for positioning the viewing side of a copy holder about three proximate axes of rotation. The axes being a proximate vertical y-axis for turning the viewing side to the left or right; a proximate horizontal x-axis for tilting the viewing side up or down; and a proximate projecting z-axis for rotating the viewing side about a z-axis of rotation where the viewing side is defined to reside in an x-y coordinate plane which is perpendicular to a z-axis of rotation so that the viewing side is correspondingly turned within the x-y coordinate plane and adjusted in position within the x-y coordinate plane.

Furthermore, the dual ball and socket assembly provides a second, distal universal joint for positioning the viewing side of a copyholder about three distal axes of rotation. The distal axes of rotation, being rigidly connected to the proximate axes of rotation by threaded dual ball and socket housing 90, and being dependent on the proximate axes for their location in space. The distal axes being a distal vertical y-axis for turning the viewing side to the left or right; a distal horizontal x-axis for tilting the viewing side up or down; and a distal projecting z-axis for rotating the viewing side about a z-axis of rotation where the viewing side is defined to reside in an x-y coordinate plane which is perpendicular to a z-axis of rotation so that the viewing side is correspondingly turned within the x-y coordinate plane and adjusted in position within the x-y coordinate plane.

Figure 11:
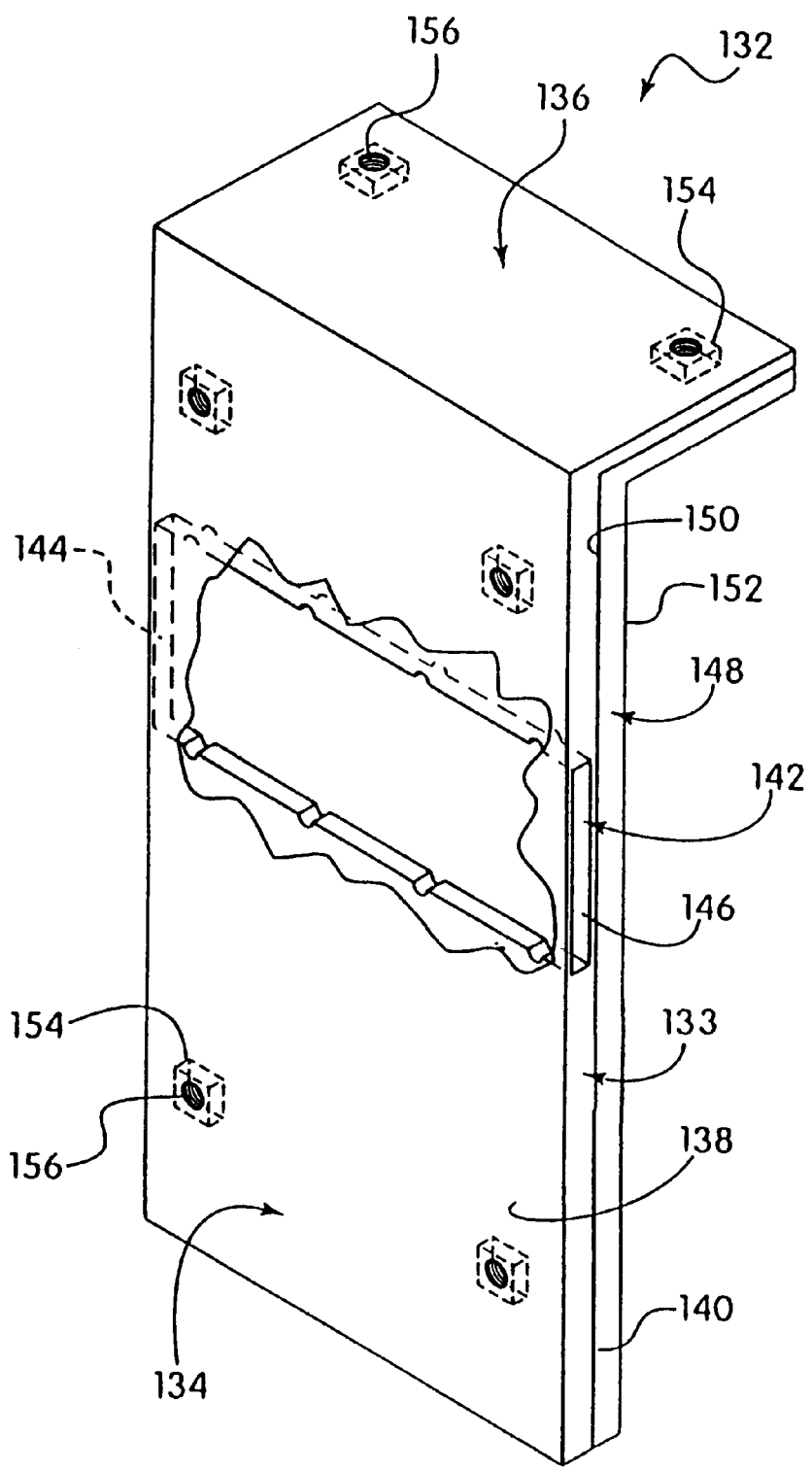
FIG. 11 is a perspective view, partially broken away, of an adherable receiving mortise, constructed in accordance with an alternative form of the present invention.

An alternative form of the present invention will now be discussed. FIG. 11 in association with FIG. 12 discloses adherable document support stand 130. Adherable document support stand 130 consists of adherable right angled support body 132 and previously discussed document holder 26.

Figure 12:
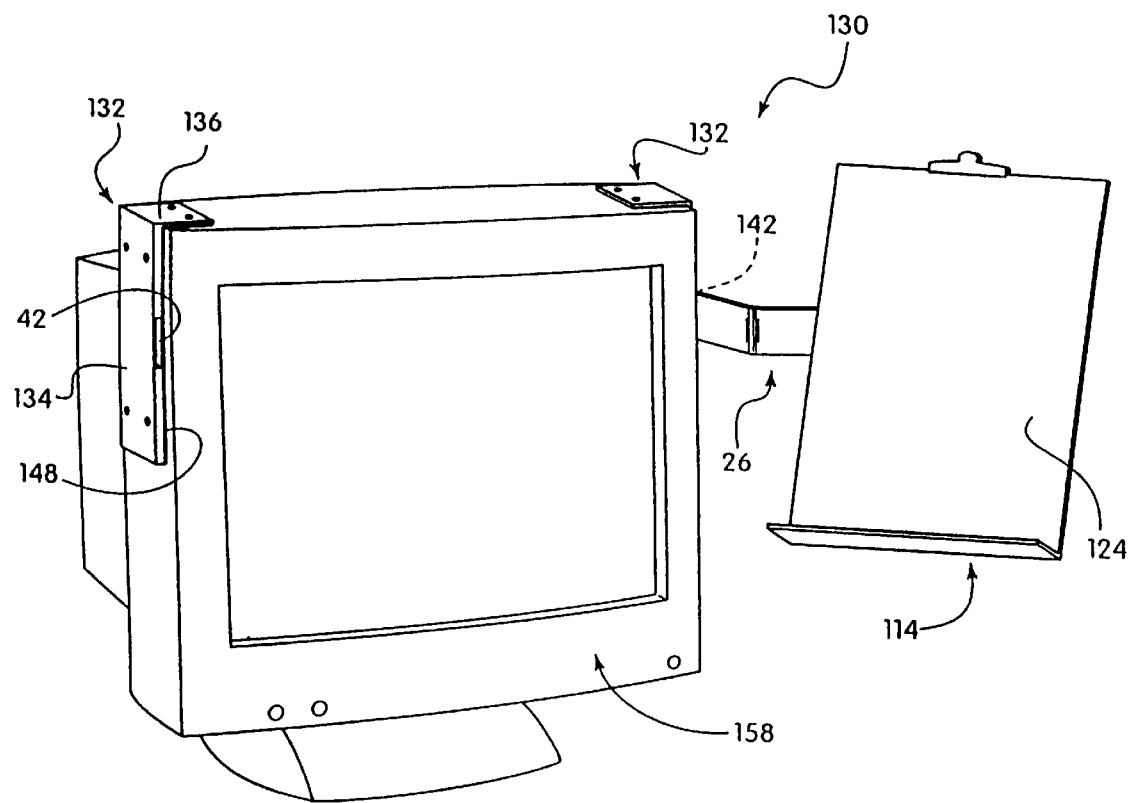
FIG. 12 is a perspective view of a mounted pair of oppositely disposed adherable receiving mortises, like the member shown in FIG. 11, mounted on a conventional monitor with one having an engaged document holder.

Adherable support body 132 consists of two major components, namely, adherable right angled mat 148 and right angled receiving support body 133. FIG. 11 discloses the first component of adherable support body 132, namely, adherable right angled mat 148. Adherable right angled mat 148, having front and rear sides 150, 152 respectively, is formed to conform to the shape of support body 133 and is made from a pliable substance such as rubber with its thickness sized to accommodate a set of embedded nuts 154. Nuts 154 are embedded in the mat by methods known in the art for bonding metal or plastic to rubber. Rear side 152 of mat 148 is provided with adhesive means and is of a pliable material in order to allow for its selective and accurate mounting on either side of a conventional video display monitor 158 as shown in FIG. 12. The adhesive means at rear side 152 of mat 148 may be of a removable, reusable stick-on type known in the art and which would allow for the remounting of the mat when desired. As also shown in FIG. 11, the second component of adherable support body 132, right angled receiving support body 133 may be formed by normally joining two planar members, namely, long planar leg 134 to short planar leg 136. Support body 133 has front side 138 and rear side 140 with receiving through mortise 142, transversely disposed across long leg 134, and being formed and housed within its body, between its front and rear sides. Receiving through mortise 142 is formed in a manner like that of receiving through mortises 28 and 30 described previously, with respect to document support monitor stand 2. As illustrated in FIG. 11, receiving through mortise 142 is provided with a pair of oppositely disposed entry openings, namely, right side entry opening 144, and left side entry opening 146.

As illustrated in FIG. 12, after mat 148 is mounted on a conventional video display monitor the final assembly of adherable support body 132 is achieved simply by mounting right angled receiving bracket 133 on top of mat 148 and securing via screws 156 passing through holes in bracket 133 and threadably engaging embedded nuts 154. Since the receiving through mortise 142 is provided with a pair of oppositely disposed entry openings 144, 146, the support body 132 is capable of being mounted to either side of a display screen. Once a side of a conventional monitor 158 is fitted with adherable receiving support bracket 132 the selective engagement of document holder 26 is provided for, thereby completing the creation of adherable document support stand 130 as shown in FIG. 12. As also shown in FIG. 12, the mounting of a pair of oppositely disposed brackets 132 on a conventional monitor 158 provides the same type of document positioning capability as document support monitor stand 2 discussed previously.

The document support stands of the present invention allow the user to support a document at a video display monitor and to position the document at a multitude of positions In space. It should be noted that the unique method for mounting a document holder on a document support monitor which has been disclosed in the present invention can be applied to a wide variety of differently sized monitors. For example, it is of importance to note that the disclosed method is not only applicable for large monitors, such as those with cathode ray tubes which may have a large casing, but also for smaller sized monitors such as liquid crystal displays which may have a smaller, overall casing size.

It is envisioned that the majority of the members of the document support stands of the present invention may be formed from a plastic or other synthetic material. The ball and socket assembly is envisioned to be of a metal fabrication although a synthetic fabrication may be desirable with some applications. As is evident from the structures described and shown in the drawings, the document support stands are mechanically simple, with few components, are easily manufactured, and which is adapted to receive and hold a document holder with the document holder having the ability to position a document in a multitude of viewing positions in space.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

I claim:

1. An adherable document support stand, which comprises:

an adherable support body, said body including means for supporting a document holder, means for adhering to a surface, and a document holder, the document holder including a support arm, the support arm having means for engaging the means for supporting a document holder and having an attachment portion; and a copyholder; and means for attaching the copyholder to the support arm, said means including distal means for positioning the copyholder about three different axes, said distal means including a distal element for attachment to the copyholder, and proximate means for positioning the distal means about a first axis, the proximate means being connected to the distal means and including a proximate element for attachment to the attachment portion of the support arm.

2. A document support stand as defined by claim 1, wherein the proximate means further includes means for positioning the distal means about a second axis.

3. A document support stand as defined by claim 2, wherein the proximate means further includes means for positioning the distal means about a third axis.

4. An adherable document support stand, which comprises:

an adherable support body, said body including means for supporting a document holder, means for adhering to a surface, and a document holder, the document holder including a support arm, the support arm having means for engaging the means for supporting a document holder and having an attachment portion; and a copyholder; and means for attaching the copyholder to the support arm, and the stand further including means for slidably extending and retracting the support arm of the document holder along a rigid z-axis.

5. A document support stand as defined by claim 4, wherein the means for attaching the copyholder to the support arm includes distal means for positioning the copyholder about three different axes, said distal means including a distal element for attachment to the copyholder, and proximate means for positioning the distal means about a first axis, the proximate means being connected to the distal means and including a proximate element for attachment to the attachment portion of the support arm.

6. A document support stand as defined by claim 5, wherein the proximate means further includes means for positioning the distal means about a second axis.

7. A document support stand as defined by claim 6, wherein the proximate means further includes means for positioning the distal means about a third axis.

8. A document support stand, which comprises:

a support body, said body including means for supporting and engaging a document holder, and an engageable document holder, and the stand further including means for slidably extending and retracting the document holder along a rigid z-axis whenever said holder is engaged with the support body.

9. A document support stand as defined by claim 8, wherein the means for supporting a document holder of the support body includes an adhering member.

10. A document support stand as defined by claim 8, wherein the document holder includes a dual ball and socket joint.

11. A document support stand as defined by claim 9, wherein the document holder includes a dual ball and socket joint.

* * * * *